May 1, 1928.
J. ALLEGRE
1,667,711
CASING FILLER FOR TIRES
Filed May 3, 1927
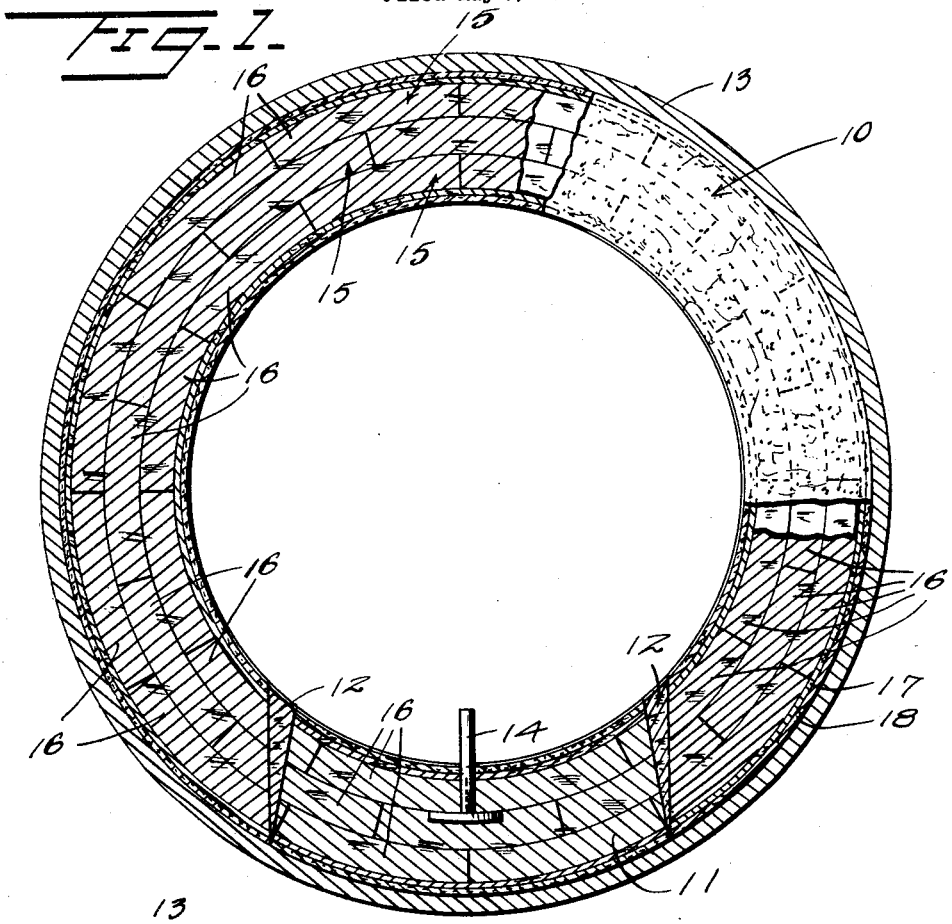
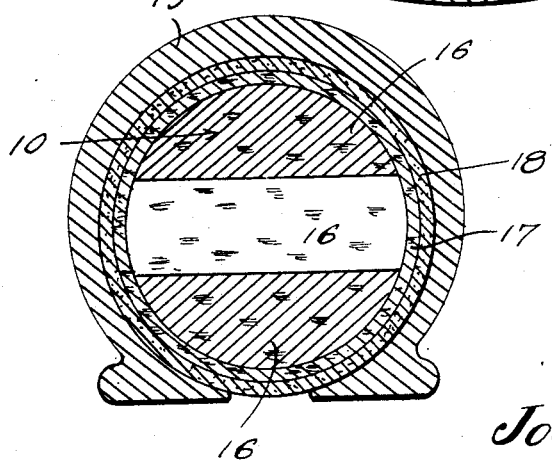
Inventor
Joseph Allegre
By Watson E. Coleman
Attorney Patented May 1, 1928.

1,667,711

UNITED STATES PATENT OFFICE.

JOSEPH ALLEGRE, OF TUOLUMNE, CALIFORNIA.

CASING FILLER FOR TIRES.

Application filed May 3, 1927. Serial No. 188,543.

This invention relates to a casing filler for tires and has for an important object thereof the provision of a device of this character which may be very readily inserted, which will be durable and efficient in service and which may be relatively cheaply manufactured.

A further and more specific object of the invention is to produce a cork filling to replace the ordinary inner tube of tire casings, which is so constructed that the cork element of the filler is protected from the elements.

These and other objects I attain by the construction shown in the accompanying drawings, wherein for the purpose of illustration is shown a preferred embodiment of my invention and wherein:—

Figure 1 is a sectional view through a tire provided with a filler constructed in accordance with my invention, the filler being shown partially in section;

Figure 2 is a transverse sectional view therethrough.

Referring now more particularly to the drawings, the filler comprises an annulus formed in two sections 10 and 11, the section 10 being substantially circular, while the section 11 fills the gap between the ends of the section 10 to complete the annulus. The section 10, as hereinafter more fully set forth, is sufficiently flexible to permit the same to be inserted in a tire casing and after this insertion, the section 11, when placed in position, will effectually prevent its removal. If desired, wedges 12 may be employed to insure proper spreading of the ends of the section 10, so that the device will fit a tire casing 13 within which it is placed. The section 11 has preferably extended from the inner surface thereof a plug or bolt 14 adapted to pass through the tire valve opening of a tire rim to lock the sections against rotation thereon. Each section 10 and 11 comprises a plurality of annular layers 15 of cork, each layer being formed in short sections 16 placed end to end and the joints between the sections 16 of adjacent layers being staggered with relation to one another.

Surrounding the body thus produced is a layer of pressed cork, indicated at 17, which serves to provide a housing for the inner body and to cover any small roughnesses in the body. The cork elements of the body are preferably of natural cork and therefore will not provide the necessary smooth finish.

Surrounding the pressed cork is a small layer of asbestos, indicated at 18, which serves to insulate the cork against any heat generated by relative movement of the casing and filler or by the separate portions of the filler and to further insulate the cork filling against the action of the elements. Such a tire filler may be very readily and cheaply produced and will provide substantially the same resiliency provided by the ordinary inner tube.

Since the construction hereinbefore set forth is capable of a certain range of change and modification without materially departing from the spirit of the invention, I do not limit myself to such specific structure except as hereinafter claimed.

I claim:—

A casing filler for the tire casings of vehicles comprising an annulus adapted to fit within the tire including a core formed of annular laminations, each lamination comprising a series of cork blocks spaced end to end, the joints between the blocks of adjacent laminations being staggered with relation to one another and a covering for the core including a sheet of compressed cork applied directly to said core.

In testimony whereof I hereunto affix my signature.

JOSEPH ALLEGRE.